US007356005B2

(12) United States Patent
Derryberry et al.

(10) Patent No.: US 7,356,005 B2
(45) Date of Patent: Apr. 8, 2008

(54) APPARATUS AND ASSOCIATED METHOD, BY WHICH TO FACILITATE SCHEDULING OF DATA COMMUNICATIONS IN A RADIO COMMUNICATIONS SYSTEM

(75) Inventors: R. Thomas Derryberry, Plano, TX (US); Zhigang Rong, Irving, TX (US); Petteri Luukkanen, Irving, TX (US)

(73) Assignee: Nokia Corporation, Espoo (FI)

( * ) Notice: Subject to any disclaimer, the term of this patent is extended or adjusted under 35 U.S.C. 154(b) by 641 days.

(21) Appl. No.: 10/485,786

(22) PCT Filed: Jun. 5, 2003

(86) PCT No.: PCT/US03/17583

§ 371 (c)(1), (2), (4) Date: Feb. 4, 2004

(87) PCT Pub. No.: WO03/105370

PCT Pub. Date: Dec. 18, 2003

(65) Prior Publication Data

US 2004/0240416 A1    Dec. 2, 2004

(51) Int. Cl.
*H04B 7/216* (2006.01)

(52) U.S. Cl. .................. 370/335; 370/342; 455/69; 455/522

(58) Field of Classification Search .......... 370/335, 370/342, 230, 231, 232, 235, 236; 714/748, 714/749; 455/69, 522, 574
See application file for complete search history.

(56) References Cited

U.S. PATENT DOCUMENTS

| | | | |
|---|---|---|---|
| 5,812,938 A | 9/1998 | Gilhousen et al. | |
| 6,442,155 B1 | 8/2002 | Suk et al. | |
| 6,546,058 B1 | 4/2003 | Gilhousen et al. | |
| 6,556,554 B1 | 4/2003 | Yun et al. | |
| 6,876,641 B2 * | 4/2005 | Banister | 370/335 |
| 6,898,438 B1 * | 5/2005 | Uchida | 455/522 |
| 2002/0093918 A1 * | 7/2002 | Kim et al. | 370/278 |

FOREIGN PATENT DOCUMENTS

| | | |
|---|---|---|
| WO | WO 99/29048 | 6/1999 |
| WO | WO 00/45527 | 8/2000 |
| WO | WO 02/30009 | 4/2002 |

OTHER PUBLICATIONS

The International Search Report for PCT/US03/17583; filed Jun. 5, 2003; Date of Completion Oct. 16, 2003; Date of Mailing Nov. 5, 2003.
The European Search Report for European Application No. 03736835.4; Filed Jun. 5, 2003; Date of Completion Mar. 30, 2007.

* cited by examiner

*Primary Examiner*—Lee Nguyen
(74) *Attorney, Agent, or Firm*—Alston & Bird LLP

(57) ABSTRACT

Apparatus, and associated method, for facilitating reverse link scheduling in a CDMA 2000 communication system (FIG. 1, 10) that provides for high data rate communication services, such as 1xEV-DV communication services. Power control bits (FIG. 1, 46) used to perform power control on the reverse link are punctured with rate grant control bits and HARQ indications. A power control bit puncturer (FIG. 1, 48) punctures the power control bits with the rate grant control bits and HARQ indications. Physical layer signaling is thereby provided without the need to define additional control channels operations.

20 Claims, 3 Drawing Sheets

APPARATUS AND ASSOCIATED METHOD, BY WHICH TO FACILITATE SCHEDULING OF DATA COMMUNICATIONS IN A RADIO COMMUNICATIONS SYSTEM

The present invention relates generally to a manner by which to facilitate the scheduling of data communications in a radio communications system, such as a CDMA 2000 communication system that provides for 1xEV-DV data communications. More particularly, the present invention relates to an apparatus, and an associated method, by which to provide, as physical layer signaling, rate selection commands and HARQ indications to a mobile, or other, communication station operable in the radio communication system.

Power control commands, sent on an existing channel, are punctured with the rate selection commands and HARQ indications. Because the signaling is carried out at the physical layer, the commands and indications are provided quickly. Backward compatibility with prior generation devices is also maintained.

BACKGROUND OF THE INVENTION

Use of a communication system through which to communicate data is a practical necessity of modern society. Data is communicated pursuant to the effectuation of many varied types of communication services. And, with continued advancements in communication technologies, additional types of communication services, making use of the advancements in communication technologies, are possible.

A communication system includes at least a first communication station and a second communication station interconnected by way of a communication channel. Data is communicated by the first communication station, referred to as a sending station, to the second communication station, referred to as a receiving station, by way of the communication channel. Data that is to be communicated by the sending station is converted, if needed, into a form to permit the data to be communicated upon the communication channel. And, the receiving station detects the data communicated upon the communication channel and recovers the informational content thereof.

A radio communication system is a type of communication system. In a radio communication system, a radio channel, defined upon a radio air interface, forms the communication channel interconnecting the sending and receiving stations. Conventional wireline communication systems, in contrast, require the use of fixed, wireline connections extending between the communications stations upon which to define the communication channel.

A radio communication system provides various advantages in contrast to a wireline counterpart. Initial installation and deployment costs associated with a radio communication system are generally less than the costs required to install and deploy a corresponding wireline communication system. And, a radio communication system can be implemented as a mobile communication system in which one or more of the communication stations operable therein is permitted mobility.

A cellular communication system is an exemplary type of mobile radio communication system. Cellular communication systems have been installed throughout significant portion of the populated areas of the world and have achieved wide levels of usage. A cellular radio communication system is a multi-user communication system in which radio communications are provided with a plurality of mobile stations. Telephonic communication of voice and data is effectuable by way of the mobile stations. Mobile stations are sometimes of sizes to permit their convenient carriage by users of the mobile stations.

A cellular radio communication system includes network infrastructure that is installed throughout the geographical area that is encompassed by the communication system. Mobile stations operable in the cellular communication system communicate, by way of radio channels, with base stations that form parts of the network infrastructure of the communication system.

Base stations are a fixed-site radio transceiver that transceives data with the mobile stations. The base stations are installed at spaced-apart locations throughout the geographical area encompassed by the communication system. Each of the base stations defines a cell, formed of a portion of the geographical area. A cellular communication system is so-called because of the cells that together define the coverage area of the communication system.

When a mobile station is positioned within a cell defined by a base station, communications are generally effectuable with the base station that defines the cell. Due to the inherit mobility of a mobile station, the mobile station might travel between cells defined by different ones of the base stations. Continued communications with the mobile station is provided through communication hand off procedures between successive ones of the base stations defining the successive ones of the cells through which the mobile station passes. Through appropriate positioning of the base stations, the mobile station, wherever positioned within the area encompassed by the communication system, shall be within communication proximity of at least one base station.

Only relatively low-powered signals need to be generated to effectuate communications between a mobile station and a base station when the base stations are suitably positioned at selected spaced-apart locations. Hand-offs of communications between the successive base stations permit continued communications without necessitating increases in the power levels at which the communication signals are transmitted. And, because the signals that are generated are all generally of low powered levels, the same radio channels can be reused at different locations of the cellular communication system. The frequency spectrum allocated to a cellular communication system is thereby efficiently utilized.

A cellular communication system is constructed, generally, to be operable pursuant to an operating specification of a particular communication standard. Successive generations of communication standards have been developed, and operating specifications defining their operational parameters have been promulgated. First-generation and second-generation cellular communication systems have been deployed and have achieved significant levels of usage. Third-generation and successor-generation systems are undergoing development, standardization, and, at least with respect to the third-generation systems, partial deployment.

An exemplary third-generation cellular communication system is a system that operates pursuant to the operating protocol set forth in a CDMA 2000 operating specification. A CDMA 2000 cellular communication system, constructed in conformity with the CDMA 2000 operating specification, provides for packet-based data communication services.

Various technology proposals by which to effectuate communication of packet data at high data rates in a CDMA 2000 communication system have been proposed. By transmitting data at high data rates, increased amounts of data are able to be communicated in a given time period.

The 1xEV-DV data communication service is one such proposal. The 1xEV-DV data service utilizes a HARQ (Hybrid-ARQ) acknowledgement/negative acknowledgement (ACK/NACK) feedback scheme. A 1xEV-DV communication service is also available at multiple data rates. That is to say, the data rates at which the data is communicated are selectable.

Control provisions by which to control the data rate of uplink data, i.e., data communicated by a mobile station to the network infrastructure of a CDMA 2000 communication system, are not set forth in the operating specification. That is to say, generally, there is no provision for controlling the data rate, and HARQ operations, to facilitate scheduling of data communications on the uplink.

A mechanism by which to facilitate uplink scheduling of data communicated pursuant to a 1xEV-DV communication service is needed.

It is in light of this background information related to packet data communication services that the significant improvements of the present invention have evolved.

SUMMARY OF THE INVENTION

The present invention, accordingly, advantageously provides apparatus, and an associated method, by which to facilitate scheduling of data communications in a radio communication system, such as a radio communication system operable pursuant to a CDMA 2000 communication scheme that provides for 1xEV-DV data communications.

Through operation of an embodiment of the present invention, a manner is provided by which to provide, as physical layers signaling, rate selection commands and HARQ (Hybrid-ARQ) indications to a mobile, or other communication, station operable in the radio communication system.

In one aspect of the present invention, power control commands, sent on an existing channel, are punctured with rate selection commands and HARQ indications. Because the signaling is carried out at a logical layer forming the physical layer of the communication system, the commands and indications are provided quickly. Backward compatibility with prior generation devices is maintained, thereby to permit continued operation of communication stations, otherwise operable in the CDMA 2000 communication system, but that do not provide for 1xEV-DV communication services.

A channel structure is defined pursuant to an embodiment of the present invention that facilitates data rate and hybrid ARQ control on a data uplink, i.e., the reverse link channels, upon which data is communicated by a mobile station to the network infrastructure. Power control bits conventionally communicated upon, e.g., a Common Power Control Channel (CPCCH), a Fundamental Channel (FCH), or a Dedicated Control Channel (DCCH) are punctured with ACK/NAK bits and RGC (Rate Grant Control) bits.

Rate requests are generated at mobile stations that are to communicate, or are communicating, 1xEV-DV data upon reverse link channels. Rate requests are communicated to the network infrastructure of the communication system. Data scheduling operations are performed at the network infrastructure. Amongst the data scheduling operation performed that the network infrastructure are rate grant selections granting, or denying, the rate requests generated by the individual ones of the mobile stations. And, thereafter, the rate grants, or rate denials, are used in the formation of rate grant control bits. Rate grant control bits are of first values to indicate a rate grant of the rate requests and of second values to indicate rate denial of the rate requests. And, the power control bits, otherwise generated to control the power levels of which the data communicated by the mobile stations, or punctured with the rate grant control bits.

Further pursuant to operation of an embodiment of the present invention, the mobile stations generate the rate requests that request, alternately, data rate increases and data rate decreases. The rate requests formed by the mobile station are selected responsive to, for instance, the operational data rate permitted of the mobile station, the amount of data that is to be communicated, and the reserve power available at the mobile station. In one implementation, a single measure is formed, in the form of a single bit, indicative of a relative persistence of the data that is to be communicated by, or is being communicated by, the mobile station.

In another aspect of the present invention, the mobile stations send data packets or frames during a communication session to effectuate a communication service. When delivered to the network infrastructure, a determination is made whether the data packet or frame has been adequately delivered. And, an ACK or NAK bit is returned to the mobile station to indicate whether the data packet has been successfully delivered to the network infrastructure. Further pursuant to operation of embodiment of the present invention, the power control bits are punctured with values of the ACK and NAK bits. The mobile station monitors channels upon which the power control bits are transmitted, and the mobile station, pursuant to such monitoring, detects the values of the HARQ feedback, formed of the ACK or NAK bits. Responsive to the value of the HARQ feedback, the mobile station selectively retransmits the data packet or frame.

The power control bits, and the rate grant control bits and HARQ feedback bits are communicated at the physical layer, thereby providing quick control of the data communicated by the mobile station on the reverse link pursuant to the 1xEV-DV communication service. Backward compatibility with mobile stations that do not operate pursuant to 1xEV-DV communications is also provided as the values of the rate grant control bits and HARQ feedback bits are otherwise considered to be power control bits.

In these another aspects, therefore, apparatus, and an associated method, is provided for a radio communication system. The radio communication system has a first communication station operable at least to send power control commands upon at least a power control channel to at least a second communication station. The power control command is used at the second communication station to control an operational parameter associated with a power level at which data subsequently to be communicated therefrom is sent. Control of selected operation of the second communication station is facilitated. A power control command puncturer is adapted to receive indications of an other-than-power control command. The power control command puncturer punctures the power control commands broadcast upon the at least the power control sub channel with the other-than-power-control command.

A more complete appreciation of the present invention and the scope thereof can be obtained from the accompanying drawings, which are briefly summarized below, the following detailed description of the presently-preferred embodiments of the invention, and the appended claims.

DETAILED OF THE DESCRIPTION

Figure 1:
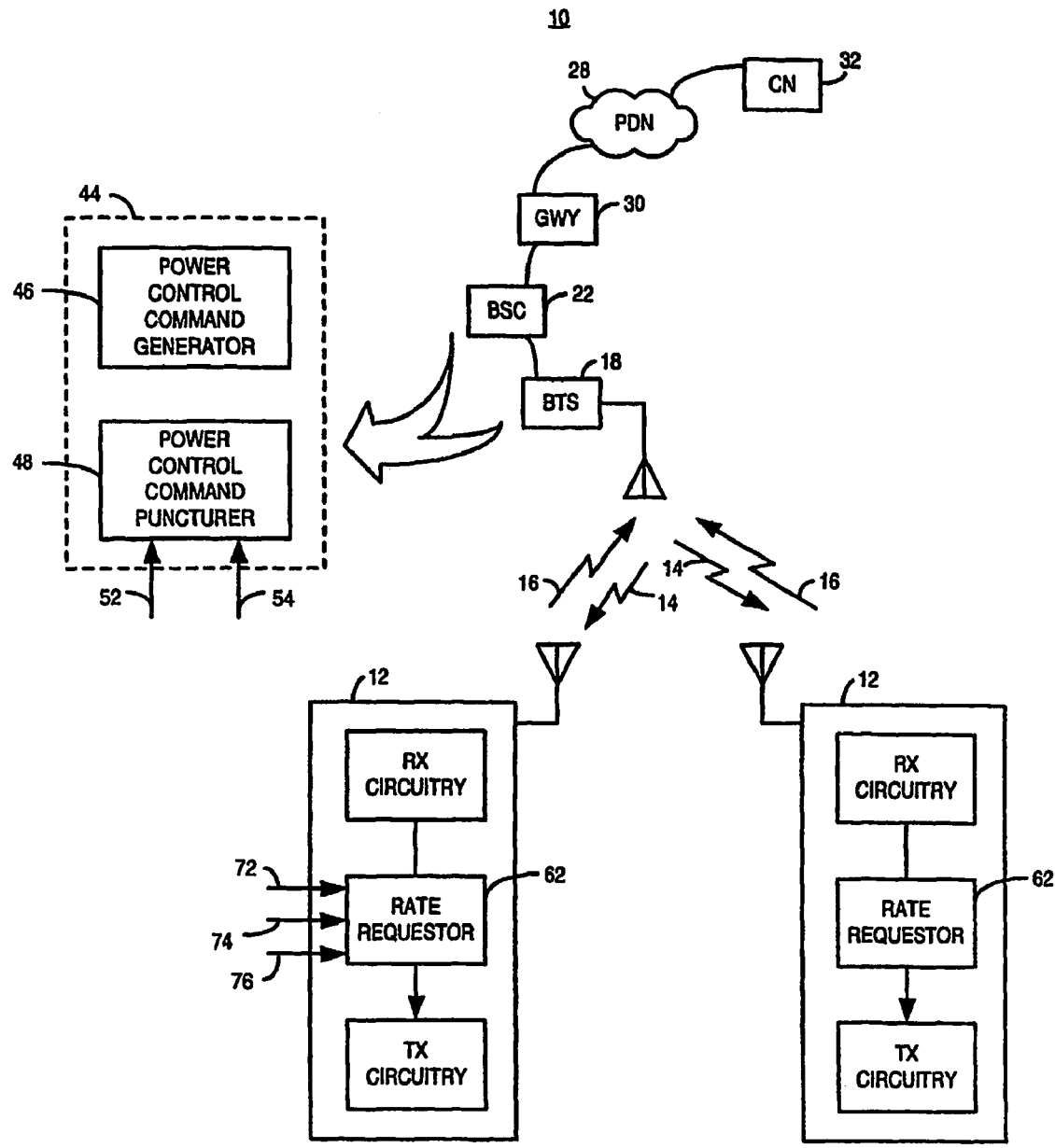
FIG. 1 illustrates a functional block diagram of a radio communication system in which an embodiment of the present invention is operable.

Referring first to FIG. 1, a radio communication system, shown generally at 10, forms a multi-user radio communications system permitting of radio communication with mobile stations. In the figure, two exemplary mobile stations 12 are represented. In the exemplary of implementation, the communication system forms a cellular communication system that operates, generally, in conformity with the operating protocols promulgated in the CDMA 2000 communication system that provides for 1xEV-DV data communications.

Embodiments of the present invention are, however, also implementable in other types of communication systems in which data communication services are effectuable at selectable data rates and in communication systems that utilize an HARQ feedback scheme. Accordingly, while the following description shall describe exemplary operation of an embodiment of the present invention with respect to its implementation in a CDMA 2000 communication system that provides for 1xEV-DV data communication services, the present invention is analogously also operable in other types of communication systems.

Two-way communications are effectuated during operation of the communication system 10. A radio air interface formed between a network infrastructure and the mobile stations defines forward link (or downlink) and reverse link (or uplink) channels upon which data is communicated to the mobile station and the data is communicated by the mobile stations. The arrows 14 are representative of forward link channels, and the arrows 16 are representative of reverse link channels. Both the forward link channels and the reverse link channels include both data channels and control channels. Communication data is communicated upon the data channel, and control data is communicated upon the data channels.

Various data channels are defined in the CDMA 2000/1xEV-DV operating specification. Power control channels are amongst the control channels that are defined in the operating specification. Power control bits are communicated upon the power control channels and are used to control the power levels at which communication data is communicated upon the data channels. On the forward link, for instance, a common power control channel (CPCCH), a dedicated control channel (DCCH), and a fundamental channel (FCH) are all defined in the CDMA 2000 operating specification. Details relating to the channels as well as the control, or other, data communicated thereon is available in the operating specification relating to CDMA 2000/1xEV-DV. One, or more, of these channels is used during operation of an embodiment of the present invention to communicate control data to the mobile station to facilitate control of rates at which 1xEV-DV data is communicated upon a reverse link channel by the mobile station to the network infrastructure. And, also pursuant to operation of an embodiment of the present invention, HARQ feedback bits are provided to the mobile station to identify whether a previously transmitted data packet upon a reverse link channel has been successfully delivered to the network infrastructure.

The network infrastructure of the communication system is here shown to include a base station 18. The base station includes radio transceiver circuitry that operates pursuant to a code division multiplexing scheme to communicate with mobile stations, such as the two mobile stations illustrated in the Figure. Forward link signals are generated upon forward links 14 for communication to the mobile stations, and reverse link signals, here generated pursuant to a code division multiple access (CDMA) communications scheme are communicated to the base station upon reverse link channels, to be received by receive circuitry of the base station. The base station forms a portion of a radio access network part of the network infrastructure. The radio access network part also includes a Base Station Controller (BSC) 22 to which the base station 18 is coupled. The base station controller operates, amongst other things, to control operation of the base station. The radio access network part of the network infrastructure is coupled to a Packet Data Network (PDN) 28, here by way of a gateway (gwy) 30. A Correspondent Node (CN) 32 is coupled to the packet data network. A correspondent node is representative of a communication node that forms an ultimate source or ultimate destination of data communicated with a mobile station 12. The correspondent node forms, for instance, a telephonic station or, for instance, a content server.

Scheduling operations are performed at the radio access network to schedule communications between the network infrastructure and the mobile station. Scheduling on the reverse link, performed at the radio access network portion of the infrastructure, is communicated to the mobile stations, and the reverse link that is communicated by the individual ones of the mobile station according to the scheduling provided thereto by the network infrastructure. Power control of the power levels of the reverse link data is also controlled at the network infrastructure portion of the radio access network.

A scheduler 44 is also shown in the Figure. The scheduler is embodied at the radio access network portion of the network infrastructure, implemented, for instance, at the base station or base station controller. The elements of the scheduler are functionally represented and are implementable in any desired manner and at any desired location. The scheduler schedules the reverse link data communications of the mobile stations 12, here also to include various parameters by which the reverse link data communications are effectuated. And, here, also, the scheduler performs the scheduling of the 1xEV-DV data communications.

The scheduler includes a power control command generator that operates in conventional manner by which to generate power control bits that are sent upon forward link channels to control the power levels at which the reverse link data is communicated. The scheduler also includes, pursuant to an embodiment of the present invention, a power control command puncturer 48. The power control command puncturer operates to puncture the power control bits generated by the power control bit generator with rate grant control bits and HARQ indications. Values of the rate grant control bits are here represented to be applied to the puncturer by way of the line 52. And, the HARQ indications are here represented to be applied to the puncturer by way of the line 54. Values of the rate grant control bits and of the HARQ indications are determined elsewhere at the scheduler or elsewhere within the infrastructure part of the communication system. Determination of the rate grants are dependent, at least in part, upon information communicated to the network infrastructure by individual ones of the mobile stations.

Various factors that affect scheduling are dynamic, i.e., changeable. Others are static. The scheduler schedules the communications on the reverse link channels in a manner best to allocate what, and how much, information is to be communicated upon the reverse link channels. The power control bits, and the punctured bits inserted therein by the puncturer are formed at the physical layer of the communication system, thereby to facilitate the speed at which the commands are communicated and the control is effectuated upon the reverse link communications. Because the rate grant control bits and HARQ indications are substituted for values of the power control bits, the operation of the scheduler is compatible both with mobile stations that are 1xEV-DV capable as well as with mobile stations that are not 1xEV-DV capable. Rate grant control bits and HARQ indications are provided to the mobile stations that are 1xEV-DV capable without the need to define an additional channel structure. Puncturing is performed by the puncturer upon power control bits generated upon any of the aforementioned channels, i.e., the CPCCH, the FCH, or the DCCH.

Figure 2:
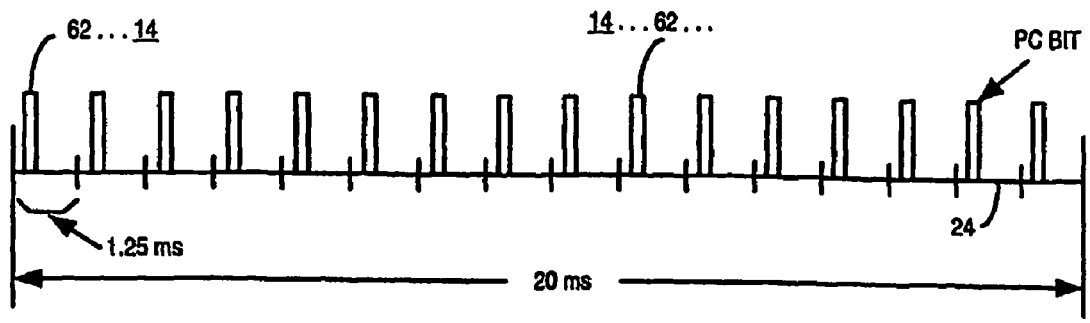
FIG. 2 illustrates a representation of an exemplary sub channel of a power control channel defined in the radio communication system shown in FIG. 1 and power control bits that are generated during operation of the radio communication system.

FIG. 2 illustrates an exemplary forward link channel 14 upon which power control bits are generated. The power control bits 62 are generated at a 800 Hz rate. These rates correspond to generation of one power control bit 62 during each 1.25 ms slot 64. When the channel 14 forms an FCH or a DCCH, there is only one power control sub channel available to control a mobile station while, when the channel 14 forms a CPCCH, typically there are 24 power control sub channels thereon, permitting simultaneous control of up to 24 mobile stations.

Referring back again to FIG. 1, the mobile stations 12 also include apparatus of an embodiment of the present invention, here forming a rate requestor 66. The rate requester generates requests that are communicated to the network infrastructure of the communication system and, responsive to which, the rate grant commands are made. Puncturing of the power control bits with the rate grant control bits is also advantageous for the reason that data rate control is analogous to, and can be considered another form of, power control. The rate request formed by the rate requester requests, in the exemplary implementation, through the generation of a single-bit a value, a rate increase or a rate decrease. The rate requester generates the rate request responsive, for instance, to indications of the amount of data that is to be communicated by the mobile station, the reserve power available at the mobile station, and the operational data rate available at the mobile station. Indications of such values are provided to the rate requester, here indicated by way of the lines 72, 74, and 76. A single measure formed by the rate requestor indicates the relative persistence of the data communicated by, or to be communicated by, the mobile station, always a function of the data rate used by the mobile station. The persistence is denoted herein as buffer activity.

Figure 3:
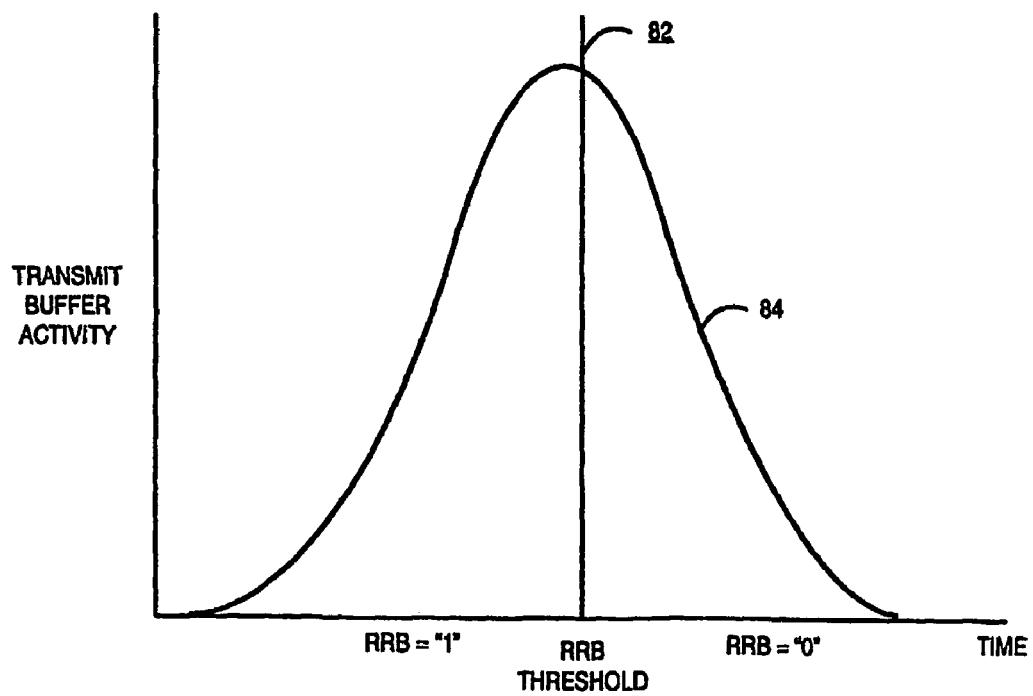
FIG. 3 illustrates a functional block diagram of a portion of a base station that forms a portion of the radio communication system shown in FIG. 1.

FIG. 3 illustrates a graphical representation, shown generally at 82, of an exemplary threshold selection performed by the rate requestor when selecting whether to request a rate increase or a rate decrease. The plot 84 is a plot of the transmitter buffer activity, plotted as a function of time. Variables, such as those just-mentioned and provided to the rate requester on the line 72, 74, and 76, are used to determine the transmit buffer activity as the function of time. Here, the activity function is assumed to be unimodal. In one implementation, for the activity status, determinations are made at the network infrastructure of the relative length of the overall data transmission assuming that the mobile station reports a metric, such as the buffer activity factor or rate requests. The rate requestor here generates the single bit rate increase request or rate decrease request depending upon whether the plot point at a given time is to the left of, or to the right of, the line 86. Data rate is alterable, for instance, by altering the modulation or coding scheme. The following table indicates various exemplary modulation and coding schemes that are incrementable pursuant operation of various embodiment of the present invention.

| Bits/Frame | Data Rate (Kbps) | R | Factor | Deletion | Symbols | Modulation |
|---|---|---|---|---|---|---|
| 168 | 9.6 | ¼ | 2x | 0 | 1536 | BPSK |
| 360 | 19.2 | ¼ | 1x | 0 | 1536 | BPSK |
| 744 | 38.4 | ¼ | 1x | 0 | 3072 | BPSK |
| 1512 | 76.8 | ¼ | 1x | 0 | 6144 | BPSK |
| 3048 | 153.6 | ¼ | 1x | 0 | 12288 | BPSK |
| 6120 | 307.2 | ¼ | 1x | 0 | 24576 | QPSK |
| 12264 | 614.4 | ½ | 1x | 0 | 24576 | QPSK |
| 18408 | 921.6 | ¾ | 1x | 0 | 24576 | QPSK |
| 27624 | 1382.4 | ¾ | 1x | 0 | 36864 | 8PSK |

Figure 4:
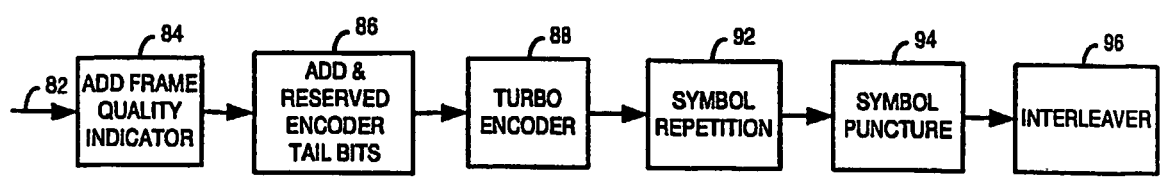
FIG. 4 illustrates a graphical representation of manners by which values of rate request bits are formed during operation of a radio communication system of an exemplary embodiment of the present invention.

FIG. 4 illustrates a functional representation of operation of a portion of the scheduler together with portions of the transmit circuitry of the base station. Data that is to be communicated upon a power control channel is formed on the line 82. At the element 84, a frame quality indicator is added. Then, at the element 86, eight reserved encoder tail bits are added. Thereafter, and as indicated by the element 88, viterbi is performed. And, thereafter, at the element 92, symbol repetition is performed. And, as illustrated at the element 94, symbol puncturing by the puncturer 48 is performed. Interleaving thereafter is performed, as indicated by the element 96.

The power control sub channels upon which power control bits, together with the rate grant control bits and HARQ indication bits, in the exemplary implementation, use encoding. Typical power control bit error rates are, for instance, 0.04. Improved performance is possible through simple repetition of communication of the data bits.

Figure 5:
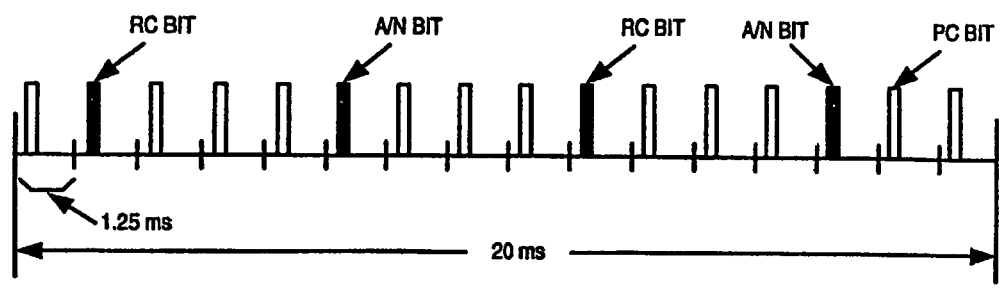
FIG. 5 illustrates a representation, similar to that shown in FIG. 2, but here in which rate grant control bits and ACK/NAK bits are substituted for selected ones of the power control bits.

FIG. 5 illustrates a representation, similar to that shown in FIG. 2, but here showing the bits generated upon one of the aforementioned power control channels, here illustrating the bits generated thereon pursuant to operation of the puncturer of an embodiment of the present invention. Pursuant to the puncturing operations, rate grant control bits 98 and AcknowledgeNegative Acknowledge (ACK/NACK) bits 102 are substituted for power control bits at selected intervals. Here, two rate grant control bits and two A/N bits are substituted for power control bits within a 20 ms. Uplink scheduling is thereby provided through the generation of the bits on the physical layer channel. Channels that are currently defined are used, thereby obviating the need to define additional control channels. And, the scheme is backwardly compatible to permit continued operation of existing devices.

The preferred descriptions are of preferred examples for implementing the invention, and the scope of the invention should not necessarily be limited by this description. The scope of the present invention is defined by the following claims.

We claimed:

1. In a radio communication system having a first communication station operable at least to send power control commands upon at least a power control channel to at least a second communication station, the power control commands used at the second communication station to control an operational parameter associated with a power level at which data subsequently to be communicated therefrom is sent, an improvement of apparatus for facilitating control of selected operation of the second communication station, said apparatus comprising:

a power control command puncturer adapted to receive indications of an other-than-power control command, said power control command puncturer for puncturing the power control commands sent upon the at least the power control subchannel with the other-than-power-control command.

2. The apparatus of claim 1 wherein the power control channel comprises a Common Power Control Channel (CPCCH) defined in a cellular CDMA 2000 communication system that provides for 1xEV-DV communication, and wherein the power control commands punctured by said power control command puncturer are sent upon the Common Power Control Channel.

3. The apparatus of claim 2 wherein the at least the second communication station comprises the second communication station and at least a third communication station, wherein the power control commands sent by the first communication station are sent upon a first part of the Common Power Control Channel to the second communication station and upon a third part of the Common Power Control Channel to the third communication station.

4. The apparatus of claim 1 wherein the power control channel comprises a Fundamental Channel (FCH) defined in a cellular CDMA 2000 communication system that provides for 1xEV-DV communication, and wherein the power control commands punctured by said power control command puncturer are sent upon the Fundamental Channel.

5. The apparatus of claim 1 wherein the power control channel comprises a Dedicated Control Channel (DCCH) defined in a cellular CDMA 2000 communication system that provides for 1xEV-DV communication, and wherein the power control commands punctured by said power control command puncturer are sent upon the Dedicated Control Channel.

6. The apparatus of claim 1 wherein the first communication station is defined in terms of logical layers, the logical layers including a physical layer, and wherein said power control command puncturer is embodied at the physical layer.

7. The apparatus of claim 1 wherein the radio communication system utilizes an HARQ (Hybrid Automatic RQ) feedback scheme to acknowledge whether receive-data is successfully received, wherein the selected operation of the second communication station comprises selective retransmission of the receive-data, and wherein the other-than-power control command, the indications of which said power control command puncturer is adapted to receive, comprise indications of whether the receive-data is successfully received.

8. The apparatus of claim 7 wherein the other-than-power-control command with which said power control command puncturer functions the power control commands comprise ACK (acknowledgement) indications to acknowledge successful reception of the receive data.

9. The apparatus of claim 7 wherein the other-than-power-control command with which said power control command puncturer punctures the power control command comprise NAK (negative acknowledge) indications to acknowledge unsuccessful reception of the receive data.

10. The apparatus of claim 1 wherein the data is communicated at a selected data rate, and wherein the other-than-power control command indications of which said power control command puncturer is adapted to receive, comprise rate control commands, values of which are determination of selection of the selected data rate at which the data is communicated.

11. In the radio communication system of claim 1, a further improvement of apparatus for the at least the second communication station, said apparatus comprising:

an operational selection requester for requesting the selected operation of the second communication station.

12. The apparatus of claim 11 wherein the data in selectably communicated by the second communication station at a selected data rate, wherein the selected operation of the second communication station comprises communicating the data at the selected data rate, and wherein requests generated by said operational selection requester request permission to communicate the data at the selected data rate.

13. The apparatus of claim 12 wherein the requests generated by said operational selection requester comprise a selected one of a rate increase request and a rate decrease request.

14. The apparatus of claim 12 wherein the selected data rate at which said operational selection requester requests permission to communicate is dependent, at least in part, upon an amount of data that is to be communicated by the second communication station.

15. The apparatus of claim 12 wherein the selected data rate at which said operational selection requester requests permission to communicate is dependent, at least in part, upon a power-capacity indicia associated with the second communication station.

16. In a method of communicating in a radio communication system having a first communication station operable at least to send power control commands upon at least a power control channel to at least a second communication station, the power control commands used at the second communication station to control an operational parameter associated with a power level at which data subsequently to be communicated therefrom is sent, an improvement of a method for facilitating control of selected operation of the second communication station, said method comprising:

obtaining indications of an other-than-power-control command associated with the selected operation; and puncturing the power control commands sent upon the at least the power control channel with the other-than-power-control command.

17. The method of claim 16 wherein the selected operation with which the other-than-power-control command is associated comprises a data rate at which the data is permitted to be communicated, wherein the other-than-data-power-control command comprises a data rate selection command, and wherein the indications obtained during said operations of obtaining comprises obtaining indications of the data rate selection command.

18. The method of claim 17 wherein the power control commands are punctured during said operation of puncturing with data rate selection commands.

19. The method of claim 17 further comprising the operation, prior to said operations of obtaining, of sending, from the second communication station to the first communication station, a data rate request requesting permission to send the data at the selected data rate.

20. The method of claim 16 wherein the radio communication uplink utilizes an HARQ (Hybrid-ARQ) feedback scheme to acknowledge whether receive-data is successfully delivered to the first communication station, wherein the selected operation comprises selective retransmission of the receive data, and wherein the other-than-power-control command, the indications of which are obtained during said operation of obtaining comprise indications of whether the receive-data is successfully received.

* * * * *